3,649,390
ALUMINO-THERMIC REACTION MIXTURE
Wilhelm Ahlert, Essen-Bredeney, Walter Bungardt, Essen-Stadtwald, Andreas Brusdeylins, Essen, Paul Damm, Essen-Steel, and Camillo Herget, Essen, Germany, assignors to Th. Goldschmidt A.-G., Essen, Germany
No Drawing. Filed Nov. 3, 1969, Ser. No. 873,629
Claims priority, application Germany, Oct. 10, 1969,
P 18 08 315.3
Int. Cl. C06b 15/00
U.S. Cl. 149—37      3 Claims

ABSTRACT OF THE DISCLOSURE

This invention relates to an aluminothermic reaction mixture consisting essentially of aluminum and iron oxide and containing about 0.1 to 5 percent by weight, based on the total weight of the mixture, of at least one aluminothermically reducible oxide having a particle size in the range of about 0.05 to 50μ.

---

Aluminothermic mixtures with the primary constituents of iron oxide, obtained from steel-roll scale, and aluminum, both in granulated form, have been known for many years. It is conventional to add to this mixture small-sized pieces or particles of steel scrap for the purpose of damping the reaction and for increasing the yield. Also known to the art is the addition of ferrous key alloys or prealloys, for example, ferromanganese and, if desired, the further addition of specific carbon carriers such as electrode carbon or cast iron. These additions, which serve to impart to the resulting aluminothermic steel a specifically desired composition, also are in the form of small pieces or particles.

Depending upon the additives which are selected, the aluminothermic reaction of a mixture of this type yields either alloyed or unalloyed cast steels of different compositions which are suitable for many technical purposes but which have been found to be primarily advantageous for performing cast weldings. In carrying out aluminothermic weldings of this type, it is conventional to employ a sand mold which partially receives the steel parts, for example rails, to be welded to each other and which mold simultaneously forms a cavity therearound which is filled, in the course of the welding procedure, with aluminothermic steel produced in a separate crucible. With this procedure, a gap between the steel parts or portions to be welded to each other will be filled, whereupon the formation of the bond is achieved. A preliminary heating of the sand mold with either liquid or gaseous fuels, in the presence of gaseous oxygen, by means of special burners facilitates the welding operation, but the degree of preheating, measured for example with reference to the mold temperature being maintained, may be different depending upon the type of the aluminothermic welding process selected.

It is a known economic advantage of the aluminothermic process described that only relatively small quantities of aluminothermic reaction mixture are required for performing the welding operation. Thus, for example, an aluminothermic total mixture of the initially specified components of approximately 6.5 kilograms is sufficient to perfectly weld a rail having the profile S 49. According to more recent findings, technically flawless welds for the same profile also have been obtained with even smaller weights of material.

In order to ensure the quality of the welded joints, special attention usually is given to two influencing factors, i.e., the mold temperature and the tapping temperature of the aluminothermic steel. It is assumed in this connection that other factors which significantly affect the quality of the weld are considered, for example, that the minimum weight of aluminothermic material employed per weld is constant and that the construction of the sand mold is made from the points of view of the mold and casting techniques, i.e., that the casting jet, during tapping, is passed in a favorable manner by the surface of the structural parts to be welded.

Experience has shown that a good weld is obtained when (a) in the solidified welded joint the original welding gap is completely filled with welding material;

(b) each of the two surfaces of the structural parts to be welded together is melted down completely and without error so that, after solidification, neither cold welded joints nor slag inclusions and pores are found, and (c) the mechanical properties of the structural parts or elements to be welded and of the aluminothermic steel filled into the gap are adapted to each other in the best possible manner.

For the prerequisite specified in (b) above, which is of particular significance insofar as the present invention is concerned, the heat of the mold and the tapping temperature have a special influence. Both regulate the physical quantity of heat available for the welding operation. If the tapping temperature is too low, for example if heat losses of the weld steel occur during the aluminothermic reaction and are too great, the metallurgical and technological quality of the cast-weld joint may be assured, according to the present state of the art, either by an increase in the mold temperature or by a greater quantity of reaction mixture, or by both of these measures. In these cases, the increase in the available physical heat linked to these measures would facilitate the welding procedure and ensure the indispensable safety of the bond formed.

It should be noted in this connection, however, that the modern aluminothermic welding practice seeks to restrict as much as possible the preheating of the weld mold, which involves an expenditure and, more particularly, is time-consuming, a trend which has become progressively important in recent years. Hence, any increase of the mold temperature would run counter to this development and thereby impede the progress of aluminothermic welding techniques. For this reason, it is not considered. On the other hand, the weight of reaction mixture employed for welding cannot be increased without economic disadvantages. Neither measure, therefore, can be considered as a technically and economically satisfactory solution of the problem.

In accordance with the present invention, a process is provided for the production of technically satisfactory aluminothermic cast weldings on a commercial basis with the use of a minimum quantity of aluminothermic reaction mixture and with only a slight, or even without any, preheating of the sand mold. In this process, the tapping temperature of the aluminothermic steel is increased as a result of the fact that the heat losses, which are inevitable due to radiation and conduction, are reduced by means of an acceleration of the reaction. As a result, the physical quantity of heat available for welding is increased.

The aluminothermic reaction mixture of the present invention contains 0.1 to 5, preferably 0.5 to 3 percent by weight, based on the total weight of reaction mixture, of at least one aluminothermically reducible oxide having a particle size in the range of 0.05 to 50μ, preferably 0.05 to 10μ.

Exemplary of aluminothermically reducible oxides which may be employed are iron oxides, manganese oxides, chromium oxides, oxides of tantalum and niobium, as well as vanadates, molybdates and tungstates, hydroxyhydrate compounds and spinels. Further, even more complex oxide compounds for example cobalt-aluminum-chromium oxides, may be employed. It is also possible to employ, within the quantities indicated, the aforementioned individual oxide components singly or in any desired combination thereof.

It is also possible to additionally admix other known oxygen-containing compounds such as peroxides, nitrates or similar compounds. Such addition must, however, be maintained within relatively narrow limits.

A mixture containing finely-divided oxides as proposed by the present invention was not suggested by the prior art since, according to the known state of the art, the finely-divided constituents heretofore were removed either by screening or by air separation. Moreover, it has been stated in the book "Die Aluminothermische Schweissung" (Aluminothermic Welding) by W. Günther and F. Proschek, VEB Carl Marhold Verlag, Halle, 1959, page 46, that the division of the foreg scale oxide should be in accordance with the following particle sizes:

<0.075 mm.
0.075–0.15 mm.
0.15–0.5 mm.
0.5–1.0 mm.
1.0–1.5 mm.

The use of particle sizes up to about 0.1 mm. is stated in this publication to be inadvisable.

The invention will be further illustrated by reference to the following specific examples which show, in tabular form, the results obtained by the addition of various oxides to a conventional aluminothermic reaction mixture. The table below shows the total duration of reaction in seconds for the various reaction mixtures.

TABLE

| Example No. | Composition of the aluminothermic mixture | Total duration of reaction, in seconds | | |
|---|---|---|---|---|
| 1 | Conventional technical aluminothermic mixture without specific oxide addition. | 16 | 19 | 18 |
| 2 | Conventional technical aluminothermic mixture plus 1% iron oxide (particle size: 0.1 to 1.5μ). | 12 | 14 | 12 |
| 3 | Conventional technical aluminothermic mixture plus 1% iron oxyhydrate particle size: 0.3 to 1.5μ). | 11 | 11 | 12 |
| 4 | Conventional technical aluminothermic mixture plus 2% chromium oxide (particle size: 0.1 to 2.0μ). | 11 | 14 | 13 |
| 5 | Conventional technical aluminothermic mixture plus 3% iron vanadate (particle size: 2.0 to 5.0μ). | 12 | 12 | 14 |
| 6 | Conventional technical aluminothermic mixture plus 1% Co-Al-Cr-oxide (particle size: 0.05 to 1.0μ). | 11 | 11 | 13 |

As is apparent from a comparison of the numerical values in the table given above, very reactive mixtures are obtained according to the present invention with considerably shorter reaction times as compared to the control mixture (Example 1). The experiments summarized in the table were carried out uniformly with a weight of aluminothermic reaction mixture of 6 kilograms with the addition of 15 percent by weight of finely-divided steel scrap and 10 percent by weight of ferromanganese containing approximately 5 percent by weight carbon and 20 percent by weight manganese.

Examples 2 to 6 show the effect of the finely-divided oxide on the duration of the reaction. A considerable reduction of the reaction time is obtained, i.e., a desired acceleration of the reaction rate is effectively achieved, whereby an increase in the tapping temperature, and therewith a gain in the heat available for welding, is also obtained.

It is not possible, however, to employ for a reaction mixture usable for aluminothermic purposes, particularly for weldings, only finely-divided oxides in order to obtain short reaction times. If this were done, the reaction would proceed at an explosive rate, in which case nearly the entire charge would be blown out of the reaction vessel. From experiments, it is apparent that the mixtures obtained after an addition of finely-divided oxides have an additional very advantageous characteristic feature which was heretofore unknown, particularly in connection with aluminothermic mixtures, and which is of significance for the effect of the present invention. The coarse-grained iron oxide particles of the basic aluminothermic mixture are enveloped by the added finely-divided oxide powder. Thus, there are produced on the coarse-grained iron oxide particles of the basic mixture thin, relatively tightly adhering layers of the finely-divided oxide particles. The aluminum powder of the basic mixture, on the other hand, is covered only to a considerably lesser degree with such oxide coatings. Acceleration of the reaction therefore is due to the fact that the initially reacting finely-divided oxide particles act on the coarser forge scale particles of the basic mixture as initial ignition for the entire mixture.

When proceeding in accordance with the present invention, there is obtained, with relatively simple and economic means, a remarkable acceleration of the reaction rate and therewith ultimately a heat gain which is of considerable significance for the technical execution of the welding.

It will be obvious to those skilled in the art that many modifications may be made within the scope of the present invention without departing from the spirit thereof, and the invention includes all such modifications.

What is claimed is:

1. An aluminothermic reaction mixture consisting essentially of aluminum powder and relatively coarse-grained iron oxide particles and containing about 0.1 to 5 percent by weight, based on the total weight of the mixture, of at least one aluminothermically reducible oxide having a particle size in the range of about 0.05 to 50μ and selected from the group consisting of iron oxide, iron oxyhydrate, chromium oxide, iron vanadate, and cobalt-aluminum-chromium oxide.

2. An aluminothermic reaction mixture according to claim 1 in which the aluminothermically reducible oxide is present in a quantity of 0.5 to 3 percent by weight.

3. An aluminothermic reaction mixture according to claim 1 in which the aluminothermically reducible oxide has a particle size in the range of 0.05 to 10μ.

References Cited

UNITED STATES PATENTS

| | | | |
|---|---|---|---|
| 3,144,690 | 8/1964 | Buckingham | 149—114 X |
| 3,160,537 | 12/1964 | Trafton | 149—37 |
| 3,325,316 | 6/1967 | MacDonald | 149—37 X |

CARL D. QUARFORTH, Primary Examiner

S. J. LECHERT, Jr., Assistant Examiner

U.S. Cl. X.R.

149—114

UNITED STATES PATENT OFFICE
CERTIFICATE OF CORRECTION

Patent No. 3,649,390        Dated March 14, 1972

Inventor(s) Wilhelm Ahlert et al

It is certified that error appears in the above-identified patent and that said Letters Patent are hereby corrected as shown below:

Column 1, line 8, "Oct. 10, 1969," should read

- - - November 12, 1968, - - -.

Column 3, line 44, "oxyhydrate par-" should read

- - - oxyhydrate (par-    - - -.

Signed and sealed this 13th day of June 1972.

(SEAL)
Attest:

EDWARD M. FLETCHER, JR.
Attesting Officer

ROBERT GOTTSCHALK
Commissioner of Patents